(12) United States Patent
Masui et al.

(10) Patent No.: US 9,127,190 B2
(45) Date of Patent: Sep. 8, 2015

(54) COVER TAPE FOR ELECTRONIC COMPONENT PACKAGING

(75) Inventors: Ken Masui, Tokyo (JP); Masayuki Hiramatsu, Tokyo (JP)

(73) Assignee: SUMITOMO BAKELITE, CO., LTD, Tokyo (JP)

( * ) Notice: Subject to any disclaimer, the term of this patent is extended or adjusted under 35 U.S.C. 154(b) by 150 days.

(21) Appl. No.: 13/824,788

(22) PCT Filed: Sep. 28, 2011

(86) PCT No.: PCT/JP2011/072150
§ 371 (c)(1),
(2), (4) Date: May 21, 2013

(87) PCT Pub. No.: WO2012/043608
PCT Pub. Date: Apr. 5, 2012

(65) Prior Publication Data
US 2013/0244027 A1  Sep. 19, 2013

(30) Foreign Application Priority Data

Sep. 30, 2010 (JP) .................. 2010-221536
Mar. 29, 2011 (JP) .................. 2011-072187

(51) Int. Cl.
*C09J 11/06* (2006.01)
*H05F 3/00* (2006.01)
(Continued)

(52) U.S. Cl.
CPC . *C09J 11/06* (2013.01); *B32B 7/12* (2013.01); *B32B 27/08* (2013.01); *B32B 27/308* (2013.01);
(Continued)

(58) Field of Classification Search
CPC ....... C09J 11/06; B65D 50/067; B65D 73/02; B32B 7/02; B32B 7/12; B32B 27/08; B32B 27/308; B32B 27/32; B32B 2250/24; B32B 2270/00; B32B 2307/308; B32B 2439/40; Y10T 428/2848; Y10T 428/2826; H05F 3/00
USPC ...................................... 428/343, 354, 355 R
See application file for complete search history.

(56) References Cited

U.S. PATENT DOCUMENTS

| 6,218,017 B1 | 4/2001 | Yamashita et al. |
| 6,787,224 B2 * | 9/2004 | Nakanishi et al. ............ 428/335 |
| 2007/0184243 A1 | 8/2007 | Ono et al. |

FOREIGN PATENT DOCUMENTS

| CN | 1202921 | 12/1998 |
| CN | 1394797 | 2/2003 |

(Continued)

OTHER PUBLICATIONS

English translation of JP 2008-285687. See IDS filed Mar. 18, 2013 for date and inventor.*

(Continued)

*Primary Examiner* — Victor Chang
(74) *Attorney, Agent, or Firm* — Amin, Turocy & Watson, LLP

(57) ABSTRACT

According to the present invention, a cover tape for electronic component packaging is provided which has suitable transparency, and which enables suppression of the charge that occurs during peeling from carrier tape. The cover tape for electronic component packaging of the present invention is provided with a heat sealant layer on top of the base layer, and the aforementioned heat sealant layer contains polyolefin resin and polyether-polyolefin copolymer. The weight ratio of the polyether-polyolefin copolymer in the aforementioned heat sealant layer is 10 weight % or more and 70 weight % or less.

15 Claims, 2 Drawing Sheets

(51) Int. Cl.
  *B32B 7/12* (2006.01)
  *B32B 27/08* (2006.01)
  *B32B 27/30* (2006.01)
  *B32B 27/32* (2006.01)
  *B65D 73/02* (2006.01)
  *B65D 50/06* (2006.01)

(52) U.S. Cl.
  CPC .............. *B32B 27/32* (2013.01); *B65D 50/067* (2013.01); *B65D 73/02* (2013.01); *H05F 3/00* (2013.01); *B32B 2250/24* (2013.01); *B32B 2270/00* (2013.01); *B32B 2307/21* (2013.01); *B32B 2307/308* (2013.01); *B32B 2439/40* (2013.01); *Y10T 428/2826* (2015.01); *Y10T 428/2848* (2015.01)

(56) References Cited

FOREIGN PATENT DOCUMENTS

| | | |
|---|---|---|
| CN | 101652297 | 2/2010 |
| JP | 2000-142786 | 5/2000 |
| JP | 2001-301819 | 10/2001 |
| JP | 2006-188679 | 7/2006 |
| JP | 2006-281452 | 10/2006 |
| JP | 2006-312489 | 11/2006 |
| JP | 2007-002020 | 1/2007 |
| JP | 2008-156396 | 7/2008 |
| JP | 2008-214583 | 9/2008 |
| JP | 2008-285687 | 11/2008 |

OTHER PUBLICATIONS

Chinese Office Action for Chinese Patent Application No. 201180046934.3 mailed Feb. 25, 2014.
European Search Report for Application No. 11829161.6-1303/2623433 Dated May 6, 2014, 9 pages.
International Search Report for International Application No. PCT/JP2011/072150 mailed on Dec. 13, 2011.
Written Opinion for International Application No. PCT/JP2011/072150 mailed on Dec. 13, 2011.

* cited by examiner

COVER TAPE FOR ELECTRONIC COMPONENT PACKAGING

TECHNICAL FIELD

The present invention relates to a cover tape for electronic component packaging.

Priority is claimed on Japanese Patent Application No. 2010-221536, filed Sep. 30, 2010, and Japanese Patent Application No. 2011-72187, filed Mar. 29, 2011, the content of which is incorporated herein by reference.

BACKGROUND ART

Surface mounted electronic components beginning with ICs, and including transistors, diodes, capacitors, and piezoelectric resistors are supplied by being packed in packages consisting of a tray that has embossed pockets capable of storage conforming to the shape of the electronic components, or of carrier tape that continuously forms such pockets and cover tape that can be heat sealed to the carrier tape. Carrier tape that packages electronic components is ordinarily wound in a reel made of paper or plastic, and is maintained in that state prior to the mounting process. During the mounting process, the stored electronic components are automatically extracted from the tray, or from the carrier tape after peeling of the cover tape, and surface mounted onto an electronic circuit board.

In conjunction with overall advances in downsizing and enhanced performance of electronic components in recent years, electrostatic-sensitive components have increased, and process troubles caused by static electricity have arisen. Particularly with respect to electronic components in the semiconductor field, it has become difficult to maintain conventional electrostatic breakdown properties in conjunction with increasing integration, miniaturization, and ever lower operating voltage. Consequently, in the production process of semiconductor component manufacturers and in the assembly process of semiconductor component users, component breakdown due to electrostatic discharge (hereinafter "ESD") has become problematic.

Outside of the semiconductor component field, breakdown of electronic components due to ESD is rare, but downsizing and weight reduction of mounted electronic components has rapidly advanced in conjunction with the downsizing and enhanced performance of electronic components in recent years. Static charging between cover tape and components due to friction during transport, and generation of static electricity during peeling of cover tape have resulted in problems of adhesion of electronic components to charged cover tape, and occurrence of process troubles such as pick-up defects. Consequently, there is a serious need for electronic component packaging that enables prevention of static electricity problems.

With respect to these problems of static electricity, Patent Document 1 adopts a technique achieving prevention of electrostatic induction from charged external objects that is based on incorporation of a low-molecular surfactant or the like into an intermediate layer, but with this method, bleeding and the like of the surfactant from the intermediate layer due to the storage environment of the film affects the physical properties of the film itself, causing deterioration in shield properties. Patent Document 2 recites that a π-conjugated conductive polymer layer is provided on the top face and bottom face of a cover-tape base layer, but when the pertinent conductive polymer layer is laminated onto the top face of the cover tape, the conductive layer peels off due to the heat of the heat iron depending on sealing conditions during sealing of the cover tape, and when it is laminated onto the bottom face, sealing properties are affected. Patent Document 3 recites that an inorganic material such as tin oxide, zinc oxide, titanium oxide, and carbon is dispersed between layers to bring out conductive properties, but when inorganic material is added, the inorganic material impairs transparency, hindering visual inspection after sealing of the cover tape.

PRIOR ART REFERENCES

Patent Documents

Patent Document 1: Japanese Unexamined Patent Application, First Publication No. 2000-142786

Patent Document 2: Japanese Unexamined Patent Application, First Publication No. 2001-301819

Patent Document 3: Japanese Unexamined Patent Application, First Publication No. 2006-312489

DISCLOSURE OF THE INVENTION

Problems that the Invention is to Solve

The object of the present invention is to provide a cover tape for electronic component packaging with excellent transparency, enabling elimination of problems of adhesion and breakage of electronic components due to static electricity, and suppression of the static charging that occurs during peeling from carrier tape.

Means for Solving the Problems

With respect to the cover tape for electronic component packaging of the present invention, a heat sealant layer is provided on a base layer, and the aforementioned heat sealant layer contains polyolefin resin and polyether-polyolefin copolymer.

With respect to the cover tape for electronic component packaging of the present invention, the weight ratio of the polyether-polyolefin copolymer in the aforementioned heat sealant layer can be set to 10 weight % or more and 70 weight % or less.

With respect to the cover tape for electronic component packaging of the present invention, the weight ratio of the polyether-polyolefin copolymer in the aforementioned heat sealant layer can be set to 20 weight % or more and 50 weight % or less.

With respect to the cover tape for electronic component packaging of the present invention, the melt flow rate (measurement method: JIS K6921-2—measurement conditions: temperature 190° C., load 21.18 N) of the aforementioned polyether-polyolefin copolymer can be set to 10-35 g/10 min.

With respect to the cover tape for electronic component packaging of the present invention, the aforementioned polyolefin resin may be one or more resins selected from a group consisting of polyethylene, polypropylene, ethylene-vinyl acetate copolymer, ethylene-(meth)acrylic acid copolymer, ethylene-methyl (meth)acrylate copolymer, ethylene-methyl acrylate copolymer, ethylene-ethyl acrylate copolymer, and ethylene-butyl acrylate copolymer.

With respect to the cover tape for electronic component packaging of the present invention, the aforementioned polyether-polyolefin copolymer may be a block copolymer.

With respect to the cover tape for electronic component packaging of the present invention, the aforementioned heat sealant layer may also contain polystyrene resin.

The cover tape for electronic component packaging of the present invention may have one or more intermediate layers between the aforementioned base layer and heat sealant layer.

With respect to the cover tape for electronic component packaging of the present invention, the aforementioned intermediate layer may contain an antistatic agent.

With respect to the cover tape for electronic component packaging of the present invention, the aforementioned antistatic agent may contain propylene carbonate and a surfactant.

With respect to the cover tape for electronic component packaging of the present invention, the surface resistance value (measurement method: JIS K6911—measurement conditions: humidity 30% RH, temperature 23° C.) of the intermediate layer containing the aforementioned antistatic agent may be less than 1.0 E+12Ω.

With respect to the cover tape for electronic component packaging of the present invention, the aforementioned surfactant may be a cationic surfactant.

With respect to the cover tape for electronic component packaging of the present invention, the aforementioned cationic surfactant may be alkyl quaternary ammonium ethosulfate.

The electronic component package of the present invention is an electronic component package obtained by heat sealing the aforementioned cover tape for electronic component packaging and carrier tape for electronic component packaging, wherein the aforementioned heat sealant layer and the aforementioned carrier tape are heat sealed in a prescribed region.

With respect to the electronic component package of the present invention, the peeling charge during peeling of the aforementioned cover tape for electronic component packaging from the aforementioned carrier tape for electronic component packaging may be 300 V or less.

Effects of the Invention

The cover tape for electronic component packaging of the present invention has excellent transparency, and enables suppression of the static charge generated during peeling from the carrier tape.

MODE FOR CARRYING OUT THE INVENTION

The details of the present invention are described below with reference to drawings.

Figure 1:
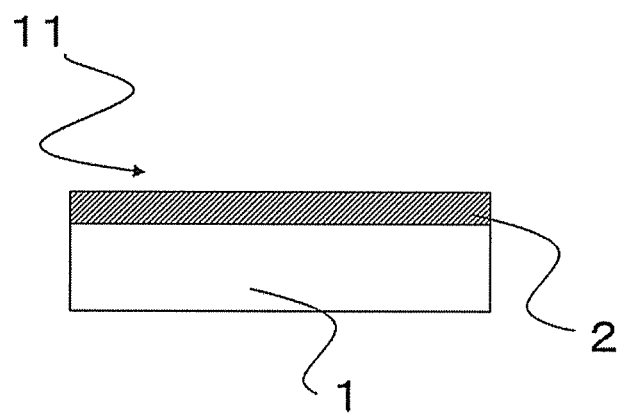
FIG. 1 is a schematic cross-sectional drawing which shows an example of the cover tape for electronic component packaging of the present invention.

As shown in FIG. 1, a cover tape 11 of the present invention is provided with at least a heat sealant layer 2 on top of a base layer 1.

(Base Layer)

As the base layer 1 used in the cover tape 11 for electronic component packaging of the present invention, a film may be employed that is obtained by suitably processing various materials according to the purpose of use, provided that there is mechanical strength capable of withstanding the external force imparted during tape processing and during heat sealing to the carrier tape, and heat resistance capable of withstanding heat sealing. Specifically, as examples of material for the base layer film, one may cite polyethylene terephthalate, polybutylene terephthalate, polyethylene naphthalate, nylon 6, nylon 66, polypropylene, polymethylpentene, polyvinyl chloride, polyacrylate, polymethacrylate, polyimide, polyether imide, polyarylate, polysulfone, polyether sulfone, polyphenylene ether, polycarbonate, ABS resin, and the like. From the standpoint of enhancing mechanical strength, polyethylene terephthalate, nylon 6, and nylon 66 are preferable. Moreover, it is also acceptable to use a laminate of two or more layers selected from the aforementioned exemplary resins as the base layer.

Unstretched film may be used in the base layer 1, but it is preferable to use film that is uniaxially or biaxially stretched in order to raise the mechanical strength of the entire cover tape 11. The thickness of the base layer 1 is preferably from 12 μm to 30 μm, and more preferably from 16 μm to 28 μm. If the thickness of the base layer 1 is below the upper limit of the aforementioned range, the rigidity of the cover tape 11 does not become excessively high, and the cover tape 11 conforms to deformation of the carrier tape without risk of peeling, even when torsional stress is applied to the carrier tape after heat sealing. If above the lower limit of the aforementioned range, the mechanical strength of the cover tape 11 is excellent, enabling suppression of the problem of rupture of the cover tape 11 during high-speed peeling when the stored electronic components are extracted.

(Heat Sealant Layer)

The heat sealant 2 is the outermost layer of the cover tape 11, and is ordinarily only one layer. In the cover tape 11 for electronic component packaging of the present invention, the heat sealant layer 2 contains polyolefin resin and polyether-polyolefin copolymer.

As the polyolefin resin, one may cite polyethylene, polypropylene, ethylene-vinyl acetate copolymer, ethylene-(meth)acrylic acid copolymer, ethylene-methyl (meth)acrylate copolymer, ethylene-methyl acrylate copolymer, ethylene-ethyl acrylate copolymer, and ethylene-butyl acrylate copolymer. Of these, from the standpoint of close adhesion to the carrier tape constituting the adherend, ethylene-vinyl acetate copolymer, ethylene-methyl (meth)acrylate copolymer, and ethylene-methyl acrylate copolymer are preferable; from the standpoint of thermal stability in particular, ethylene-methyl acrylate copolymer or ethylene-methyl (meth) acrylate copolymer is preferable.

By using polyether-polyolefin copolymer, it becomes possible to impart conductivity to the heat sealant layer 2. The polyether-polyolefin copolymer is immiscible with polyolefin resin, and a striped conductive circuit is formed due to formation of a sea-island structure during film fabrication. Therefore, antistatic properties are manifested with excellent persistence from directly after molding. Excellent conductivity cannot be manifested when the resin is miscible with polyolefin resin. From the standpoint of stable conductivity, it is preferable that the polyether-polyolefin copolymer be a block copolymer. In the case of a random copolymer, the existence of the ether portion that manifests conductivity is dispersed and irregular, with the result that conductivity is sometimes inferior. Moreover, it is also possible to use a polyether-polyolefin copolymer to which lithium ions are added as the polyether-polyolefin copolymer.

As resin to which an antistatic agent is added in the heat sealant layer 2, in addition to polyether-polyolefin copolymer, one may cite polyether ester amide block copolymer. However, if there is no immiscibility with polyolefin resin, it is difficult to manifest the property of sea-island structure formation during film fabrication. That is, in the case where there is compatibility with the polyolefin resin that is the base resin, the antistatic resin is dispersed, and antistatic performance cannot be effectively manifested. Therefore, a polyether-polyolefin copolymer is also preferable for purposes of effectively imparting antistatic properties. With respect to this point, a polyether-polyolefin copolymer forms a striped conductive circuit that is alloyed with the aforementioned polyolefin resin, and manifests antistatic properties with excellent persistence from directly after molding.

The weight ratio of the polyether-polyolefin copolymer contained in the aforementioned heat sealant layer 2 is preferably from 10 weight % to 70 weight %, more preferably from 20 weight % to 50 weight %, and still more preferably from 30 weight % to 40 weight % in the heat sealant layer 2.

By setting the weight ratio of the polyether-polyolefin copolymer in the heat sealant layer 2 at or above the lower limit of the aforementioned range, it is possible to obtain excellent antistatic properties, and by setting it at or below the upper limit of the aforementioned range, film formation is facilitated.

The surface resistance value of the heat sealant layer 2 is preferably adjusted to be $10^4$-$10^{10}$ Ω/sq. (measurement conditions: 23° C., 50% RH). To the aforementioned blend, for purposes of preventing blocking that arises during transport before use, it is also acceptable to add any type of particle from among oxide particles whose primary ingredient is silicon, magnesium, or calcium—e.g., silica, talc, and the like—or polyethylene particles, polyacrylate particles, and polystyrene particles, or an alloy thereof. As the method of formation of the pertinent layer, the extrusion lamination method is preferable. According to the type of device (electronic components) packaged using this cover tape 11 for electronic component packaging, resin with different antistatic properties may also be added for purposes of inhibiting frictional charging properties of the device and the cover tape 11 for electronic component packaging.

As a method for peeling the cover tape 11 for electronic component packaging of the present invention from the carrier tape, one may adopt the method of causing cohesion failure of the heat sealant layer 2. Cohesion failure is a phenomenon where the heat sealant resin itself ruptures during peeling from the carrier tape. Compared to a transfer peeling mechanism or a surface peeling mechanism, cohesion failure is able to inhibit static charging during peeling, because peeling occurs between resins of the same type. A heat sealant layer 2 capable of cohesion failure can be obtained by adding one or more resins selected from among polystyrene and styrene methyl (meth)acrylate copolymers to the resin blend of the aforementioned heat sealant layer 2. It is also acceptable to add a hydrogenated styrene-butadiene-styrene block copolymer. As the method of formation of the pertinent layer, one may cite the coextrusion method and the extrusion lamination method.

In addition to the aforementioned compatibility factor, a fluidity factor also contributes to achieving antistatic performance by addition of the aforementioned polyether-polyolefin copolymer to the heat sealant layer 2. A higher fluidity of the resins that forms the heat sealant layer facilitates formation of the antistatic resin that exists as islands during fabrication of film with a sea-island structure, and facilitates realization of antistatic performance. From the standpoint of effectively achieving antistatic properties, the melt flow rate of JIS K6921-2 (measurement conditions: temperature 190° C., load 21.18 N) is preferably from 10 g/min to 35 g/min. Furthermore, from the standpoint of film fabrication properties, it is preferably from 10 g/min to 20 g/min.

(Intermediate Layer)

Figure 2:
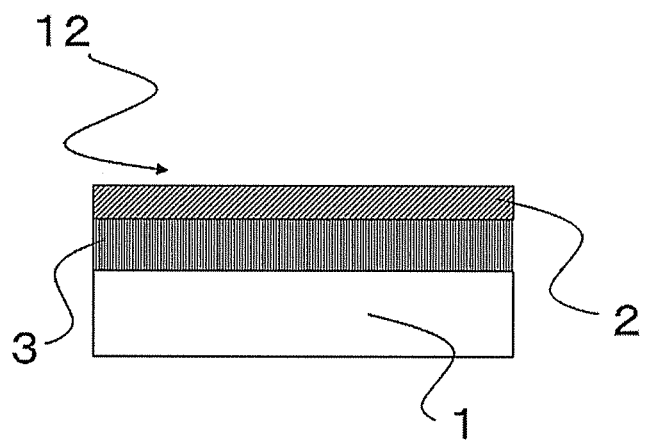
FIG. 2 is a schematic cross-sectional drawing which shows an example of the cover tape for electronic component packaging of the present invention.

As shown in FIG. 2, an intermediate layer 3 may be provided between the base layer 1 and the heat sealant layer 2 according to the purpose of use of a cover tape 12 for electronic component packaging of the present invention.

(Cushion Layer)

In the case where the purpose is to impart cushioning properties during heat sealing, the intermediate layer 3 may be formed as a cushion layer using a pliable resin such as straight-chain low-density polyethylene, low-density polyethylene, elastomer resin, or ethylene-vinyl acetate copolymer.

(Adhesive Layer)

In the case where the purpose is to enhance adhesive properties between the respective layers of the cover tape 12 for electronic component packaging, the intermediate layer 3 may be formed as an adhesive layer by thermal fusion of a maleic acid-modified adhesive resin, or by coating of an isocyanate, imine, or titanate adhesive material or the like. When this is done by coating, the antistatic performance of the cover tape can be enhanced by adding an antistatic agent to the coating liquid.

As the antistatic agent to be added when imparting antistatic performance to the aforementioned adhesive layer, an agent in which a cationic surfactant is dissolved in propylene carbonate is preferable. In this case, the propylene carbonate functions as an ion dissociating agent even when humidity is low, and there is little humidity dependence, enabling the antistatic performance of the pertinent coated surface to be kept at $1.0 \times 10^{12}$ Ω/sq. or less even at a humidity of 30% RH.

As the aforementioned surfactant, an agent that is transparent when dissolved in propylene carbonate is preferable, and one may cite, for example, a non-aqueous ionic electrolyte of a cationic antistatic agent or the like. From the standpoint of antistatic properties even in a non-ionic electrolyte, alkyl quaternary ammonium ethosulfate is preferable.

Static electricity generated at the exterior of the cover tape can be efficiently inhibited by imparting antistatic performance to the intermediate layer in the foregoing manner. Even in the case where static electricity is generated at the exterior, polarization is moderated by the antistatic effects of the intermediate layer, acting to cancel the electric potential of the exterior. For example, static charge when peeling at 0.1 sec/tact under humidity of 30% RH or less can be suppressed to 50 V, whereas the generated voltage would be on the order of 150 V without the antistatic effects of the intermediate layer 3.

Figure 3:
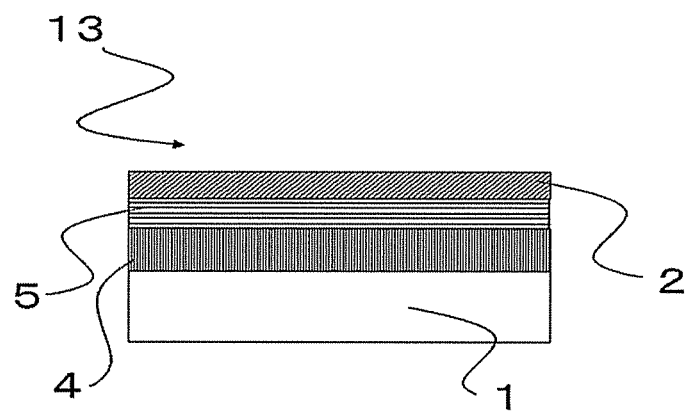
FIG. 3 is a schematic cross-sectional drawing which shows an example of the cover tape for electronic component packaging of the present invention.

Two or more intermediate layers may be provided according to the properties that are required. For example, improvement of cushioning properties and interlayer strength can be simultaneously achieved when a cover tape 13 for electronic component packaging is provided with a total of four layers by forming an intermediate layer 4 as an adhesive layer, and an intermediate layer 5 as a cushion layer, as shown in FIG. 3.

(Method of Manufacture of Cover Tape for Electronic Component Packaging)

The base layer 1 of the cover tape for electronic component packaging of the present invention may be formed from a single layer of biaxially stretched film by extrusion, or from a laminar film by lamination of biaxially stretched film. The heat sealant layer 2 and the intermediate layer 3 may be formed by carrying out the dry lamination method or the extrusion lamination method on top of the base film.

(Method of Use of Cover Tape for Electronic Component Packaging)

Figure 4:
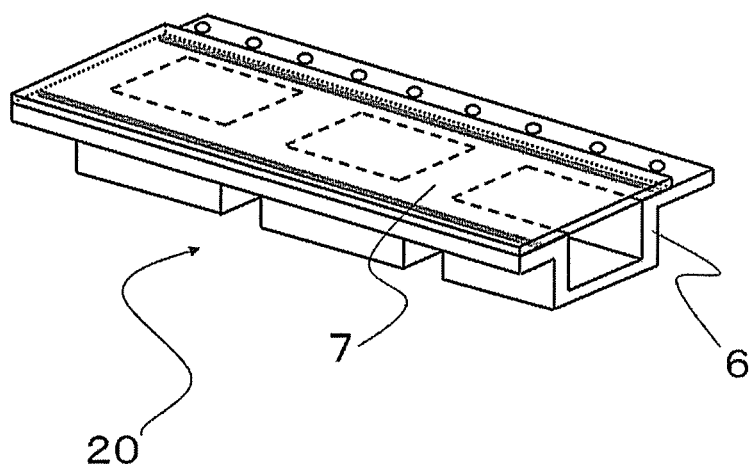
FIG. 4 is a schematic perspective view which shows an example of the electronic component package of the present invention.

As shown in FIG. 4, the cover tape of the present invention may, for example, be used as cover material 7 of a carrier tape 6 for electronic component conveyance that is continuously provided with recessed pockets conforming to the shape of the electronic components. Specifically, the cover tape may be used with an electronic component package 20 by performing heat sealing so that the openings of the aforementioned recessed pockets are sealed. By this means, it is possible to prevent the electronic components stored inside the carrier tape pockets from falling out during conveyance, and protect them from environmental contamination.

With respect to the electronic component package 20 obtained from the carrier tape 6 for electronic component conveyance and the cover tape for electronic component packaging, the peeling charge during peeling of the cover tape for electronic component packaging from the carrier tape 6 for electronic component conveyance is preferably 300 V or less from the standpoint of preventing electrical breakage of the stored electronic components and preventing adhesion thereof to the cover tape during unsealing.

WORKING EXAMPLES

Working examples of the present invention are shown below, but the present invention is not limited in any way by these working examples.

Working Example 1

(Base Layer)
Biaxially stretched polyester film with a thickness of 16 μm (E7415, manufactured by Toyobo Co., Ltd.) was used as the base layer.
(Intermediate Layer)
An adhesive layer was formed by coating an urethane-isocyanate 2-pack hardening adhesive (primary ingredient: Takelak A385, hardener: Takenate A50, manufactured by Mitsui Chemicals Co., Ltd.) onto the base layer, and a cushion layer was further formed by laminating low-density polyethylene (Petrosen 203, manufactured by Toso Co., Ltd.) onto the adhesive layer by the extrusion lamination method (extrusion temperature: 300° C.).
(Heat Sealant Layer)
A resin composition for a heat sealant layer was produced by a biaxial mixing extruder according to the blend of Table 1, and a film of 10 μm was formed on top of the cushion layer by the extrusion lamination method to obtain a cover tape for electronic component packaging.

Working Example 2

The same procedure was followed as in Working Example 1, except that the heat sealant layer was made according to the blend of Table 1.

Working Example 3

The same procedure was followed as in Working Example 1, except that, with respect to the adhesive layer of the intermediate layer, an adhesive was used which was obtained by producing the aforementioned urethane acrylate adhesive and an antistatic agent (an antistatic agent obtained by blending propylene carbonate and a surfactant (a cationic surfactant, Elegan 264-W, manufactured by NOF Corporation) in a 50/50 weight ratio) according to the blend shown in Table 1. Otherwise, with respect to Working Example 3, the surface resistance value of the adhesive layer of the intermediate layer was measured (measurement conditions: 23° C., 30 RH), and the result was $1.0 \times 10^{10}$ Ω/sq.

Working Example 4

The same procedure was followed as in Working Example 1, except that the heat sealant layer was made according to the blend of Table 1.

Working Example 5

The same procedure was followed as in Working Example 3, except that the adhesive layer of the intermediate layer was made according to the blend of Table 1.

Comparative Example 1

The same procedure was followed as in Working Example 1, except that the heat sealant layer was made only with ethylene-methyl acrylate copolymer.

Comparative Example 2

The same procedure was followed as in Working Example 1, except that the heat sealant layer was made according to the blend of Table 1.

(Raw Materials Used in Heat Sealant Layer)
The raw materials used in the heat sealant layers of the working examples and the comparative examples were as follows.
Ethylene-methyl acrylate copolymer:
  Elvaloy AC 1820, manufactured by Mitsui-DuPont Polychemicals Co., Ltd.
Styrene-methyl (meth)acrylate copolymer:
  Estyrene MS-600, manufactured by Nippon Steel Chemical Co., Ltd.
Polyether-polyolefin block copolymer:
  Pelestat 212 (MFR: 12 g/10 min), manufactured by Sanyo Chemical Industries, Ltd.
Antimony-doped tin oxide
  T-1, manufactured by Mitsubishi Materials Electronic Chemicals Co., Ltd.

The following evaluation was conducted with respect to all working examples and comparative examples. The results are shown in Table 1.

(Peeling Electrostatic Voltage)
After slitting the cover tape to a width of 5.5 mm, heat sealing to a carrier tape of 8 mm width (material: carbon-containing polystyrene) was conducted (size of heat iron during heat sealing: 0.5 mm width×16 mm length, 2 rows punched 4 times) by adjusting the heat sealing temperature so that strength during peeling was 40 cN. Subsequently, electrostatic voltage on the cover tape was measured during peeling of the cover tape at 0.1 sec/1 tact (4 mm pitch)=average of 2,400 mm/min. Otherwise, measurement of electrostatic voltage was carried out using a surface potential meter manufactured by TREK Co., Ltd., with the distance between the sample and the probe set at 1 mm. Peeling electrostatic voltage is shown as an absolute value.

(Surface Resistance Value of Heat Sealant Layer)

The surface resistance value of the heat sealant layer (hereinafter simply "surface resistance value") was measured in accordance with JIS K6911.

(Opacity)

Opacity was measured in accordance with JIS K7105.

TABLE 1

|  |  |  | Working example 1 | Working example 2 | Working example 3 | Working example 4 | Working example 5 | Comparative example 1 | Comparative example 2 |
|---|---|---|---|---|---|---|---|---|---|
| Intermediate layers | Adhesive layer blend | Urethane-isocyanate adhesive | 100 | 100 | 50 | 100 | 50 | 100 | 100 |
|  |  | Propylene carbonate + surfactant | 0 | 0 | 50 | 0 | 50 | 0 | 0 |
|  | Cushion layer |  | Low-density polyethylene | Low-density polyethylene | Low-density polyethylene | Low-density polyethylene | Low-density polyethylene | Low-density polyethylene | Low-density polyethylene |
| Heat sealant layer blend | Ethylene-methyl acrylate copolymer |  | 50 | 50 | 50 | 60 | 20 | 100 | 70 |
|  | Styrene-methyl (meth)acrylate copolymer |  | 20 | 10 | 20 | 20 | 20 | 0 | 0 |
|  | Polyether-polyolefin block copolymer |  | 30 | 40 | 30 | 20 | 60 | 0 | 0 |
|  | Antimony-doped tin oxide |  | 0 | 0 | 0 | 0 | 0 | 0 | 30 |
| Evaluation results | Peeling electrostatic voltage (V) (23° C., 30% RH) |  | 210 | 238 | 80 | 280 | 20 | 2433 | 420 |
|  | Surface resistance (Ω/sq.) of heat sealant (23° C., 30% RH) |  | $6.3 \times 10^9$ | $1.3 \times 10^9$ | $5.1 \times 10^9$ | $1.2 \times 10^{10}$ | $7.2 \times 10^8$ | $>1.0 \times 10^{13}$ | $8.9 \times 10^{10}$ |
|  | Opacity (%) |  | 22 | 20 | 19 | 17 | 28 | 15 | 55 |

The blending values in the table are represented by weight ratio for every layer.

As shown by the evaluation results, the working examples having the configuration of the present invention were superior in terms of peeling electrostatic voltage, surface resistance value, and opacity, and working example 3 was particularly excellent in terms of peeling electrostatic voltage. On the other hand, comparative example 1 in which the heat sealant layer contained neither polyether-polyolefin block copolymer nor styrene-methyl (meth)acrylate copolymer resulted in a large peeling electrostatic voltage and surface resistance value, and comparative example 2 in which the heat sealant layer contained antimony-doped tin oxide resulted in a trend toward lower peeling electrostatic voltage and surface resistance value, while opacity was high.

INDUSTRIAL APPLICABILITY

As the cover tape for electronic component packaging of the present invention exhibits excellent antistatic properties and transparency, it may be suitably used in electronic component packaging applications requiring antistatic properties and visibility of contents. In particular, it may be suitably used as the cover tape of carrier tape that is used during conveyance and storage of electronic components.

DESCRIPTION OF THE REFERENCE NUMERALS

1: base layer
2: heat sealant layer
3: intermediate layer
4: intermediate layer (adhesive layer)
5: intermediate layer (cushion layer)
6: carrier tape for electronic component packaging
7: cover material
11, 12, 13: cover tape for electronic component packaging
20: electronic component package

The invention claimed is:

1. A cover tape for electronic component packaging, comprising a heat sealant layer on a base layer, wherein said heat sealant layer contains polyolefin resin, polyether-polyolefin copolymer, and styrene methyl (meth)acrylate copolymer.

2. The cover tape for electronic component packaging according to claim 1, wherein the weight ratio of the polyether-polyolefin copolymer in said heat sealant layer is 10 weight % or more and 70 weight % or less.

3. The cover tape for electronic component packaging according to claim 2, wherein the weight ratio of the polyether-polyolefin copolymer in said heat sealant layer is 20 weight % or more and 50 weight % or less.

4. The cover tape for electronic component packaging according to claim 1, wherein a melt flow rate (measurement method: JIS K6921-2—measurement conditions: temperature 190° C., load 21.18 N) of said polyether-polyolefin copolymer is 10-35 g/10 min.

5. The cover tape for electronic component packaging according to claim 1, wherein said polyolefin resin is one or more resins selected from a group consisting of polyethylene, polypropylene, ethylene-vinyl acetate copolymer, ethylene-(meth)acrylic acid copolymer, ethylene-methyl (meth)acrylate copolymer, ethylene-methyl acrylate copolymer, ethylene-ethyl acrylate copolymer, and ethylene-butyl acrylate copolymer.

6. The cover tape for electronic component packaging according to claim 1, wherein said polyether-polyolefin copolymer is a block copolymer.

7. The cover tape for electronic component packaging according to claim 1, which has one or more intermediate layers between said base layer and heat sealant layer.

8. The cover tape for electronic component packaging according to claim 7, wherein said intermediate layer contains an antistatic agent.

9. The cover tape for electronic component packaging according to claim 8, wherein said antistatic agent contains propylene carbonate and a surfactant.

10. The cover tape for electronic component packaging according to claim 8, wherein the surface resistance value (measurement method: JIS K6911—measurement conditions: humidity 30% RH, temperature 23° C.) of the intermediate layer containing said antistatic agent is less than 1.0 E+12Ω.

11. The cover tape for electronic component packaging according to claim 9, wherein said surfactant is a cationic surfactant.

12. The cover tape for electronic component packaging according to claim 11, wherein said cationic surfactant is alkyl quaternary ammonium ethosulfate.

13. An electronic component package obtained by heat sealing the cover tape for electronic component packaging according to claim 1 and carrier tape for electronic component packaging, wherein said heat sealant layer and said carrier tape are heat sealed in a prescribed region.

14. The electronic component package according to claim 13, wherein a peeling charge during peeling of said cover tape for electronic component packaging from said carrier tape for electronic component packaging is 300 V or less.

15. The cover tape for electronic component packaging according to claim 1, wherein said heat sealant layer consists essentially of polyolefin resin, polyether-polyolefin copolymer, and styrene methyl (meth)acrylate copolymer.

* * * * *